US012798577B2

(12) United States Patent
Eswaran

(10) Patent No.: US 12,798,577 B2
(45) Date of Patent: Nov. 17, 2026

(54) AUTOMATIC SPEED CONTROL

(71) Applicant: JAGUAR LAND ROVER LIMITED

(72) Inventor: Sridhar Eswaran, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 22 days.

(21) Appl. No.: 18/862,478

(22) PCT Filed: Apr. 28, 2023

(86) PCT No.: PCT/EP2023/061354
§ 371 (c)(1),
(2) Date: Nov. 1, 2024

(87) PCT Pub. No.: WO2023/213730
PCT Pub. Date: Nov. 9, 2023

(65) Prior Publication Data

US 2025/0282354 A1 Sep. 11, 2025

(30) Foreign Application Priority Data

May 4, 2022 (GB) ...................................... 2206482

(51) Int. Cl.
*B60W 30/14* (2006.01)
*B60W 30/18* (2012.01)

(52) U.S. Cl.
CPC .... *B60W 30/146* (2013.01); *B60W 30/18145* (2013.01); *B60W 2520/10* (2013.01); *B60W 2552/05* (2020.02); *B60W 2552/10* (2020.02)

(58) Field of Classification Search
CPC .. B60W 30/143; B60W 30/146; B60W 20/12; B60W 50/14; G05D 1/0257;
(Continued)

(56) References Cited

U.S. PATENT DOCUMENTS 4,858,134 A * 8/1989 Eto .......................... B62D 6/00 701/41
4,893,239 A * 1/1990 Eto .......................... B62D 5/00 701/1
(Continued)

FOREIGN PATENT DOCUMENTS

DE 102013222265 A1 * 4/2015 ............ B60W 50/14
EP 0819912 A2 1/1998
(Continued)

OTHER PUBLICATIONS

ISA European Patent Office, International Search Report and Written Opinion Issued in Application No. PCT/EP2023/061354, Aug. 10, 2023, WIPO, 12 pages.
(Continued)

*Primary Examiner* — Yuri Kan
(74) *Attorney, Agent, or Firm* — McCoy Russell LLP

(57) ABSTRACT

Aspects of the present invention relate to an automatic speed controller, an automatic speed control system, to a method for automatic speed control, and to a vehicle. The automatic speed comprises an input for receiving a road classification signal from a road classification module and a vehicle speed information signal from a speed information module, wherein the road classification signal comprises information relating to a road on which the vehicle may travel, and the vehicle speed information signal comprises a speed limit value for the road; an output for outputting a speed offset signal for use in setting a speed of the vehicle; a processor arranged to determine the speed offset signal comprising an offset value, in dependence on the road classification signal and the speed information signal.

13 Claims, 3 Drawing Sheets

(58) Field of Classification Search
CPC ........ G01C 21/3697; B62D 5/00; B62D 6/00; B60K 28/06
See application file for complete search history.

(56) References Cited

U.S. PATENT DOCUMENTS

| | | | | |
|---|---|---|---|---|
| 6,778,896 | B1 | 8/2004 | Matsuura et al. | |
| 2007/0106445 | A1 | 5/2007 | Suzuki et al. | |
| 2014/0067226 | A1* | 3/2014 | Lee | G01C 21/3697 701/96 |
| 2017/0297566 | A1* | 10/2017 | Matsumura | B60K 28/06 |
| 2018/0345953 | A1 | 12/2018 | Mizoguchi | |
| 2020/0156631 | A1* | 5/2020 | Lin | G05D 1/0257 |
| 2021/0009128 | A1* | 1/2021 | Jokela | B60W 20/12 |
| 2021/0350148 | A1 | 11/2021 | Shanmugaraj et al. | |
| 2022/0009487 | A1* | 1/2022 | Belle | B60W 30/146 |

FOREIGN PATENT DOCUMENTS

| | | | |
|---|---|---|---|
| EP | 2022694 | A1 | 2/2009 |
| GB | 2589031 | A | 5/2021 |
| WO | 2015178841 | A1 | 11/2015 |

OTHER PUBLICATIONS

Great Britain Intellectual Property Office, Search Report under Section 17 Issued in Application No. GB2206482.8, Sep. 16, 2022, 7 pages.

* cited by examiner

AUTOMATIC SPEED CONTROL

CROSS REFERENCE TO RELATED APPLICATIONS

The present application is a U.S. National Phase of International Application No. PCT/EP2023/061354 entitled "AUTOMATIC SPEED CONTROL," and filed on Apr. 28, 2023. International Application No. PCT/EP2023/061354 claims priority to Great Britain Patent Application No. 2206482.8 filed on May 4, 2022. The entire contents of each of the above-listed applications are hereby incorporated by reference for all purposes.

TECHNICAL FIELD

The present disclosure relates to automatic speed control. Aspects of the invention relate to an automatic speed controller, an automatic speed control system, to a method for automatic speed control, and to a vehicle.

BACKGROUND

It is known to provide intelligent systems within vehicles to adapt functionalities of the vehicle based on the input of various sensors. One such system is adaptive cruise control where the vehicle's speed may be automatically adjusted to maintain a certain distance from a vehicle in front. Furthermore, autonomous vehicles will adhere to the speed limit of the road on which they are travelling.

However, the legal speed limit or the user's preferred speed for a portion of road may not be desirable speed for that portion of road.

It is an aim of the present invention to address one or more of the disadvantages associated with the prior art.

SUMMARY OF THE INVENTION

Aspects and embodiments of the invention provide an automatic speed controller, an automatic speed control system, a method for automatic speed control, and a vehicle as claimed in the appended claims According to an aspect of the present invention there is provided an automatic speed controller for a vehicle, the automatic speed controller comprising: an input for receiving a road classification signal and a vehicle speed information signal, wherein the road classification signal comprises information relating to a road on which the vehicle may travel, and the vehicle speed information signal comprises information relating to vehicle speed; an output for outputting a speed offset signal for use in setting a speed of the vehicle; a processor for determining the speed offset signal, in dependence on the road classification signal and the speed information signal.

In this way, detailed information relating to the portion of road being travelled by a vehicle may be used to adapt the speed of the vehicle for a suitable speed for that portion of the road.

According to another aspect of the present invention there is provided an automatic speed controller for a vehicle, the automatic speed controller comprising one or more controllers, the automatic speed controller comprising: an input for receiving a road classification signal from a road classification module and a vehicle speed information signal from a speed information module, wherein the road classification signal comprises information relating to a road on which the vehicle may travel, and the vehicle speed information signal comprises information relating to vehicle speed; an output for outputting a speed offset signal for use in setting a speed of the vehicle; a processor arranged to determine the speed offset signal comprising an offset value, in dependence on the road classification signal and the speed information signal.

Considering detailed information comprising road classification information relating to the portion of road being travelled by a vehicle allows a suitable speed for comfortable and safe driving on that portion of road to be determined.

Optionally, the processor is arranged to determine a speed for the vehicle, in dependence on the speed offset signal. The speed may be derived from the speed offset signal, independently or in dependence on the current or a recent speed of the vehicle, or in dependence on a pre-set or target speed for the vehicle.

The speed for the vehicle may be derived from the speed offset signal. The speed offset signal may indicate a speed for the vehicle to travel at, an adjustment to a current speed, an adjustment to a target speed, or another suitable speed or speed adjustment. This is a convenient and efficient way of determining the vehicle speed.

The speed information signal may include a speed at which the vehicle is travelling. The speed information signal may include a target speed. The target speed may be a speed limit for the road, such as a legal speed limit. In this way, the controller is configured to adapt the vehicle speed based on the speed limit in force on the road and considering the detailed information relating to the road.

The processor may be arranged to determine the speed for the vehicle by applying the offset value to the target speed. Applying the offset value may comprise adjusting the speed at which the vehicle is travelling by a fixed amount, by a percentage amount, or other suitable manner. The adjustment may represent a reduction or an increase the speed at which the vehicle is travelling. In this way, the vehicle speed value may be adjusted in a convenient way.

Optionally, the speed information signal includes a target lateral acceleration. Lateral acceleration is acceleration transverse to the direction of movement of the car. High lateral acceleration can decrease the comfort of the occupants of the vehicle, thus providing a suitable speed value to reduce lateral acceleration will increase occupant comfort.

Optionally, the input is for receiving a curvature signal comprising information relating to a curvature profile of the road, and the processor is arranged to determine the speed offset signal in dependence on the road classification signal, the speed information signal and the curvature signal. The curvature profile may comprise the radius of a curve in the road. The curvature signal may be derived from a digital map of the road, in dependence on the location of the vehicle. By considering the curvature signal in combination with the road classification signal, the invention allows comfortable cornering speeds to be provided for all types of road.

The processor may be arranged to derive the speed from the speed offset value. The speed offset value may directly or indirectly indicate a suitable vehicle speed. The processor may be arranged to determine the speed for the vehicle by applying the offset value to the target lateral acceleration. Applying the offset value may comprise adjusting speed at which the vehicle is travelling or a pre-set amount. The adjustment may be made by a fixed amount, by a percentage amount, or other suitable manner. The adjustment may comprise reducing or increasing the speed in question.

Optionally, the road classification signal is derived from map information and sensor information. Including both sources of information provides detailed and accurate information on the road the vehicle is travelling. The map information may be obtained from a digital map based on the current location of the vehicle. The digital map may provide information relating to the curvature profile of the road, the class of the road, the number of lanes of the road, and/or the form of way of the road. The sensor information may be derived from sensors including computer vision sensors, LIDAR and so on located on the vehicle. The sensors may provide information relating to the width of the lane, the number of lanes of the road, the lane markings, and the visibility of the road.

According to a further aspect of the present invention, there is provided automatic speed control system, comprising an automatic speed controller according to the present invention; and the road classification module and the speed information module. Such a system may efficiently and accurately provide a speed value for the vehicle to travel. The automatic speed control system may comprise a powertrain control unit arranged to control the speed of the vehicle according to the speed offset signal. This is an efficient manner in which to implement automatic speed control in a vehicle. The automatic speed control system may comprise a computer vision system for analysing the road and may comprise a location module to determine the vehicle's location.

According to yet another aspect of the present invention, there is provided a vehicle comprising an automatic speed controller according to the present invention or an automatic speed control system according to the present invention. Such a vehicle would be able to provide improved automatic speed control to a user.

According to a still further aspect of the present invention there is provided a method for automatic speed control in a vehicle, comprising: receiving a road classification signal from a road classification module and a vehicle speed information signal from a speed information module, wherein the road classification signal comprises information relating to a road on which the vehicle may travel, and the vehicle speed information module comprises information relating to vehicle speed; determining a speed offset signal comprising an offset value, in dependence on the road classification signal and the speed information signal; and outputting the speed offset signal for use in setting a speed of the vehicle.

Optionally, the method comprises determining a speed for the vehicle, in dependence on the speed offset signal. The determining may be further in dependence on the speed information signal.

The speed information signal may include a target speed. The target speed may be a speed limit for the road, such as a legal speed limit.

Optionally, the method comprises determining the speed for the vehicle by applying the offset value to the target speed.

The speed information signal may include a target lateral acceleration.

Optionally, the method comprises receiving a curvature signal comprising information relating to a curvature profile of the road, and determining the speed offset signal in dependence on the road classification signal, and the speed information signal and the curvature signal.

The method may comprise determining the speed for the vehicle by applying the offset value to the target lateral acceleration.

The method may comprise determining the road classification signal from map information and sensor information According to a still further aspect of the present invention there is provided computer readable instructions which, when executed by a computer, are arranged to perform a method according to the present invention.

According to another aspect of the present invention there is provided an automatic speed controller for a vehicle, the automatic speed controller comprising one or more controllers, the automatic speed controller comprising: an input for receiving a road classification signal from a road classification module and a vehicle speed information signal from a speed information module, wherein the road classification signal comprises information relating to a road on which the vehicle may travel, and the vehicle speed information signal comprises information relating to vehicle speed; an output for outputting a speed offset signal for use in setting a speed of the vehicle; a processor arranged to determine the speed offset signal comprising an offset value, in dependence on the road classification signal and the speed information signal.

According to a further aspect of the present invention there is provided an the automatic speed controller comprising one or more controllers, the automatic speed controller comprising: an input for receiving a road classification signal from a road classification module and a vehicle speed information signal from a speed information module, wherein the road classification signal comprises information relating to a road on which the vehicle may travel, and the vehicle speed information signal comprises a speed limit value for the road; an output for outputting a speed offset signal for use in setting a speed of the vehicle; a processor arranged to determine the speed offset signal comprising an offset value, in dependence on the road classification signal and the speed information signal.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
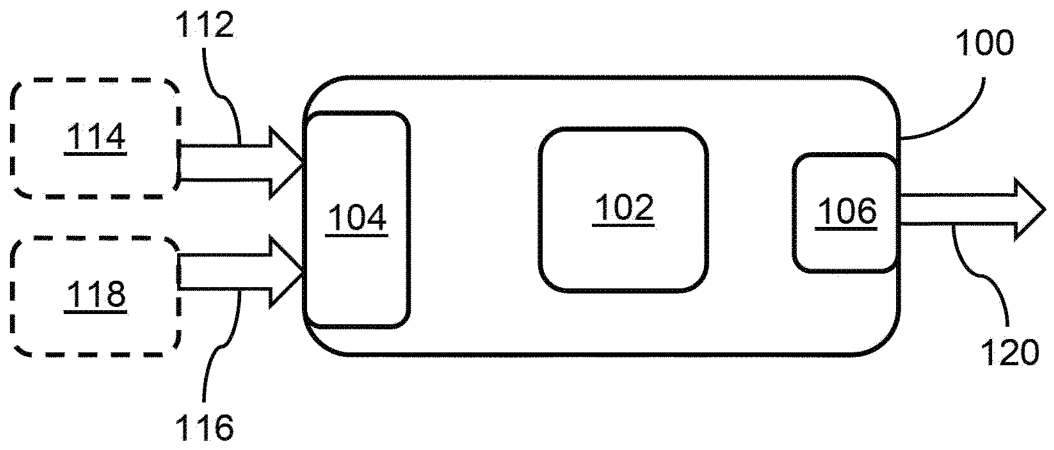
FIG. 1 shows a block diagram of an automatic speed controller according to an embodiment of the invention.

An automatic speed controller for a vehicle in accordance with an embodiment of the present invention is described herein with reference to the accompanying FIG. 1. The automatic speed controller 100 comprises a processor 102, an input 104 and an output 106. The input 104 is suitable for receiving a road classification signal 112 from a road classification module 114 and a vehicle speed information signal 116 from a speed information module 118. The processor is configured to determine a speed offset signal 120 in dependence on the road classification signal 112 and the speed information signal 116. The speed offset signal 120 comprises a speed offset value. The output 106 is suitable for outputting the speed offset signal 120.

Figure 2:
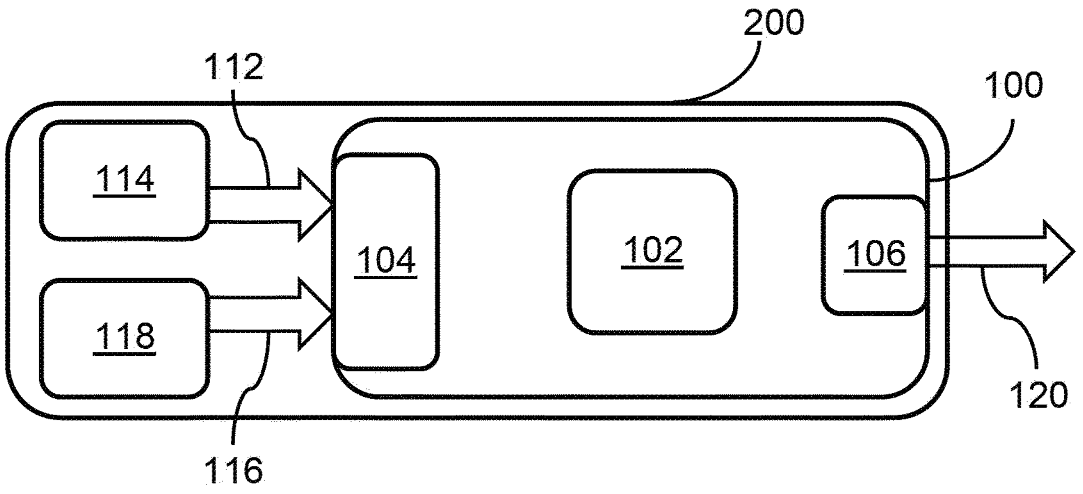
FIG. 2 shows a block diagram of an automatic speed controller according to another embodiment of the invention.

Referring now to FIG. 2, there is shown an automatic speed control system 200, wherein the automatic speed controller 100, the road classification module 114 and the speed information module 118 are comprised within the automatic speed control system 200.

Figure 3:
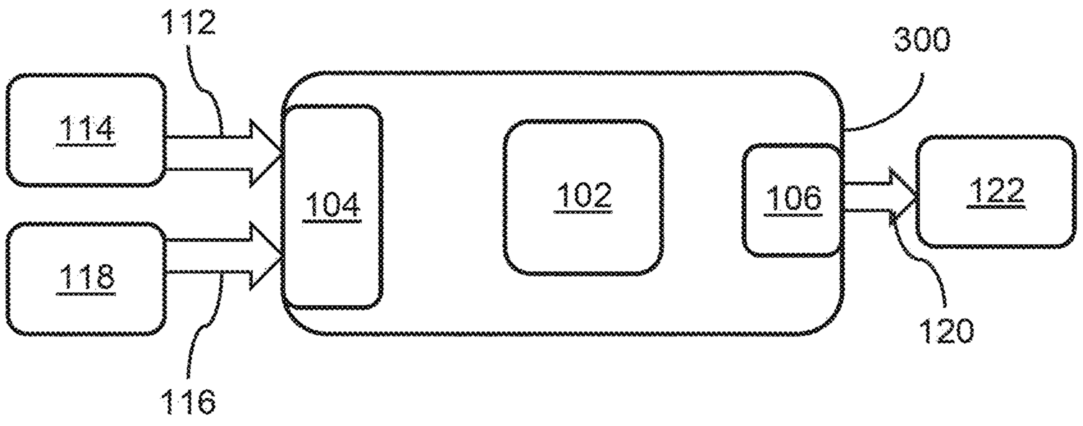
FIG. 3 shows a block diagram of an automatic speed controller according to a further embodiment of the invention.

Referring now to FIG. 3, there is shown a further embodiment of the automatic speed controller 300, wherein the output 106 is configured to transmit the speed offset signal 120 to a powertrain control unit 122 arranged to control the speed of the vehicle. The powertrain control unit may control the speed of the vehicle based on the speed offset signal 120. The automatic speed controller 300 of FIG. 3 may comprise the automatic speed controller 100 as described in relation to FIG. 1 and the automatic speed control system 200 as described in relation to FIG. 2 may comprise the automatic speed controller 300 of FIG. 3.

Any of the automatic speed controllers 100, 300 of FIGS. 1 and 3 may comprise a computer vision system for analysing the vehicle's surroundings including the road and road furniture, and may comprise a location module to determine the vehicle's location. The automatic speed controllers 100, 300 may comprise additional modules as will be understood by the person skilled in the art.

The road classification module 114 may process information received from sensors or other modules of the vehicle to determine the road classification signal 112. The information used by the road classification module 114 may comprise the road class; the number of lanes; the width of the lane or lanes; the road markings; the visibility of the road ahead including daylight levels; the road surface; the slope and gradient of the road; the form of way; the weather conditions, acceleration data, such as the user's selected acceleration profile and the like.

Form of way may be understood to refer to the form of road, for example, motorway, carriageway, roundabout, service road and so on.

The road class may be understood to refer to information about the volume of traffic and vehicle speeds are expected on the road in question, and may also relate to the connectivity and importance of the road. In an example, road class may be assigned as follows in Table 1:

TABLE 1

| Class | Description |
|---|---|
| 1 | Roads allowing for high volume, maximum speed traffic movement |
| 2 | Roads allowing for high volume, high speed traffic movement |
| 3 | Roads providing for high volume traffic movement |
| 4 | Roads allowing for a high volume of traffic movement at moderate speeds between neighbourhoods |
| 5 | Roads whose volume and traffic movement are below the level of any functional class |

The number of lanes may be classified according to the travelling direction. In an example, values relating to lanes may be assigned as follows in Table 2:

TABLE 2

| Value | Number of Lanes in Driving Direction |
|---|---|
| 0 | Single lane road |
| 1 | One lane in each driving direction |
| 2 | Two lanes in each driving direction |

The type of road surface may include, for example, gravel, asphalt, tarmac, concrete, and so on.

The road classification module 114 may receive data from other modules within the vehicle, which information may be used in the determination of the road classification signal 112. For example, a computer vision module (not shown) and/or a map module may provide data on the lane width, number of lanes, lane markings, the road surface, the slope of the road, gradient of the road, daylight levels, weather conditions, road visibility, the road class, and form of way. A telematics unit (not shown) of the vehicle may provide data on the current location of the vehicle to allow the map data to be analysed for the relevant location.

The road classification module 114 may receive data from a communications module where the data is received by the vehicle from an external source. In an example, the road classification module 114 may receive data indicative of the towing status of the vehicle.

An acceleration profile module may provide information on the acceleration profile that is in use on the vehicle. In some vehicles, there may be a number of options for the acceleration profile, which may be selected by the user or in another suitable manner. The acceleration profile may comprise information on how forceful the acceleration of the vehicle may be, particularly in autonomous driving modes. In an example, possible acceleration profile options include eco, comfort, sport, and dynamic.

The road classification module 114 may process this received data to derive the road classification signal 112 using a look-up table or other methods apparent to the skilled person, such as machine learning. The road classification signal 112 may comprise a road classification value. An example look-up table is provided in Table 3 below.

TABLE 3

| Road Class | No. of Lanes | Form of way | Lane width | Lane markings | Road visibility | Road curvature | Acceler. profile | Scaling factor |
|---|---|---|---|---|---|---|---|---|
| 2 | 2 | Motorway | 3 m | Both | 300 m | 100000 m | Comfort | 1.0 |
| 3 | 1 | Carriageway | 3 m | Both | 100 m | 1000 m | Dynamic | 1.0 |
| 5 | 1 | Carriageway | 2.75 m | Right | 200 m | 1000 m | Eco | 0.95 |
| 5 | 0 | Carriageway | 3 m | None | 200 m | 500 m | Comfort | 0.85 |

In Table 3, the number of lanes may refer to the number of lanes in the direction of travel. "Acceler. Profile" is acceleration profile.

The road classification signal may comprise a numerical value. Such a numerical value may be an indication of the risk profile for the portion of road on which the vehicle is travelling.

In an example, the road classification signal comprises a road classification value, which may be considered a scaling factor. The scaling factor may be configured to be inversely proportional to the risk. In this way, when the road classification signal indicates a low risk for the road on which the vehicle is travelling, a high scaling factor may be output as part of the road classification signal. A higher value of the scaling factor results in a higher vehicle speed than a lower value of the scaling factor, and vice versa. A road classification value, scaling factor or the like may be determined and used in other ways as will be apparent to the person skilled in the art.

Additionally, or alternatively, the road classification signal may comprise a categorical variable, for example "No offset" "Low", "Med", "High", "Max". These categories may be converted to a numerical value, such as a percentage or a fixed value to subtract.

The speed information module 118 may receive information relating to the speed and acceleration of the vehicle. The speed information module 118 may receive information relating to the speed at which the vehicle is travelling, the current legal speed limit for the road on which the vehicle is travelling, an upcoming change of legal speed limit on the for the road on which the vehicle is travelling, a set speed as input from driver such as a cruise control speed, and other such information. The speed information signal may include a target speed, which may be a speed limit for the road, such as a legal speed limit for the road. The speed information module 118 may receive the information relating to the speed at which the vehicle is travelling from a vehicle data module of the vehicle. The speed information module 118 may receive the information relating to speed limits from map data, from a computer vision system adapted to interpret road signage, and other suitable sources.

The speed information module 118 may process this data to derive the vehicle speed information signal 116 using a look-up table or other methods apparent to the skilled person. In some examples, the data received is not processed further, and may be passed to the processor as part of the vehicle speed information signal 116.

In relation to the automatic speed controllers 100, 300 of FIGS. 1, and 3 and the automatic speed control system 200 of FIG. 2 the processor 102 is arranged to determine the speed offset signal 120 comprising a speed offset value. A suitable speed for the vehicle to travel may be determined in dependence on the speed offset signal 112. In an example, the speed offset signal 120 may indicate an adjustment to the current speed of the vehicle, for example that the vehicle should reduce speed by a certain amount or could increase speed by a certain amount. In a further example, the speed offset signal 120 may indicate an adjustment to a target speed, such as a speed limit or a cruising speed. In another example, the speed offset signal 120 may comprise a speed value for the vehicle to travel at, where this suitable speed for travel may be derived according the examples above of adjusting an existing or target speed, or in another suitable manner.

As mentioned in the example above, the processor 102 may determine the suitable speed for the vehicle by applying the offset value to the target speed. In this way, the offset value may be used to adjust the speed at which the vehicle is travelling. The vehicle speed may be increased or decreased, and may be adjusted based on a fixed amount, where the offset value is added or subtracted from the target speed, or by a percentage or scale amount based on the offset value. Other mechanisms for adjusting the target speed using the offset value will be apparent to the skilled person. The skilled person will understand that similar methods may be used to make calculations based on the vehicle's current speed.

The processor 102 may determine the suitable speed for the vehicle according to the equation of $$V_s = T_s - O \tag{1}$$

where $V_s$ is the speed for the vehicle, $T_s$ is the target speed and O is the offset value.

As described in relation to FIG. 3, the speed offset signal 120 may be provided to a powertrain control unit 122 to facilitate control of the vehicle speed in autonomous driving modes. The user may have the option to override the speed offset signal such that no offset is applied to the vehicle speed. The speed offset signal 120 may additionally or alternatively be used to provide information to a driver, to suggest a suitable speed for the vehicle.

Figure 4:
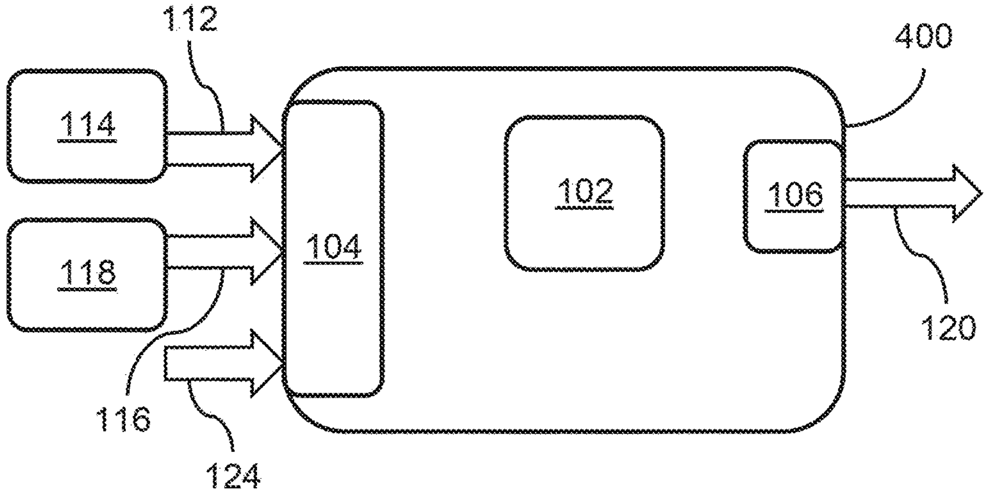
FIG. 4 shows a block diagram of an automatic speed controller according to a further embodiment of the invention.

Referring now to FIG. 4, there is shown a further embodiment of the automatic speed controller 400, wherein the input 104 is suitable for receiving a curvature signal 124, comprising information relating to a curvature profile of the road of interest. In particular, the curvature profile may comprise the radius of a curve in the road. The curvature signal 124 may be received from the road classification module 114 or another suitable module. The curvature profile may be derived from map data, and the curvature may be provided directly to the input 104 from a digital map module. Speeds that are suitable for use while driving on a substantially straight portion of road may not be suitable for travelling around corners. Similarly, a vehicle speed that feels comfortable taking a corner having a particular radius may feel too quick on a corner having the same radius in a narrow road.

The vehicle speed information signal comprises a target lateral acceleration. The target lateral acceleration may be provided by an acceleration profile module, such as that discussed herein for providing information on the acceleration profile that is in use on the vehicle. The acceleration profile module may form part of the speed information module. In some examples, the target lateral acceleration is provided directly from the acceleration profile module to the input 104. Reducing speed while the vehicle is cornering may improve user comfort levels by reducing the lateral forces experienced by the user while the vehicle is travelling around a bend.

The processor 102 is configured to determine the speed offset signal comprising an offset value, in dependence on the road classification signal and the speed information signal. As discussed previously herein, the speed offset signal may indicate an adjustment to a current speed of the vehicle, an adjustment to a target speed of the vehicle, or a suggested suitable speed for the vehicle.

In an example, the speed offset signal indicates a suitable speed according to equation (2) below:

$$V_C = \sqrt{(R \times A_L \times C_R)} \tag{2}$$

where $V_C$ is the suitable speed for driving around a corner having curvature C, R is the radius of the corner, $A_L$ is the target lateral acceleration, and $C_R$ is a road classification value derived from the road classification signal 112.

In another example, the speed offset signal indicates a suitable speed according to equation (3) below:

$$V_C = \sqrt{(R \times A_L)} \times C_R \tag{3}$$

where the variables have the same definitions as in equation (2).

The curvature profile may comprise information on the road camber surface curvature. Camber information may also be included in the derivation of the road classification signal.

In use, the automatic speed controllers 100, 300, 400 and the automatic speed control system 200 may be used to provide an adjusted speed value for a vehicle travelling on a portion of a road, wherein the adjustment is based on information related to the portion of the road and information on speed and acceleration preferences. The information related to the portion of the road is in the form of the road classification signal 112. The information on speed, speed preferences and acceleration preferences is in the form of the speed information signal.

The automatic speed controllers 100, 300, 400 and the automatic speed control system 200 may be used to provide information to a powertrain system and so control the speed of the vehicle, for example in an autonomous driving mode. Additionally, or alternatively, the automatic speed controllers 100, 300, 400 and the automatic speed control system 200 may be used to suggest a suitable speed to a driver.

Embodiments of the invention are particularly suited to adjusting a vehicle's speed while approaching or going around a corner, and adjusting a vehicle's speed in light of the legal speed limit and the information related to the portion of the road.

The road classification signal 112 may be derived from map information, information from sensors on the vehicle including LIDAR, computer vision sensors and cameras, and other suitable sensors. The sensors may provide information such as the number of lanes and their width, the road markings and signage, and the visibility. This information is not typically available from map-based systems. The road classification signal may comprise a road classification value. The road classification value may be derived from a look-up table based on the information received from the map and sensor systems.

The speed information signal may comprise information of the speed and accelerations targets for the vehicle. These targets may be derived from user settings as to acceleration, legal requirements, and other such methods.

Figure 5:
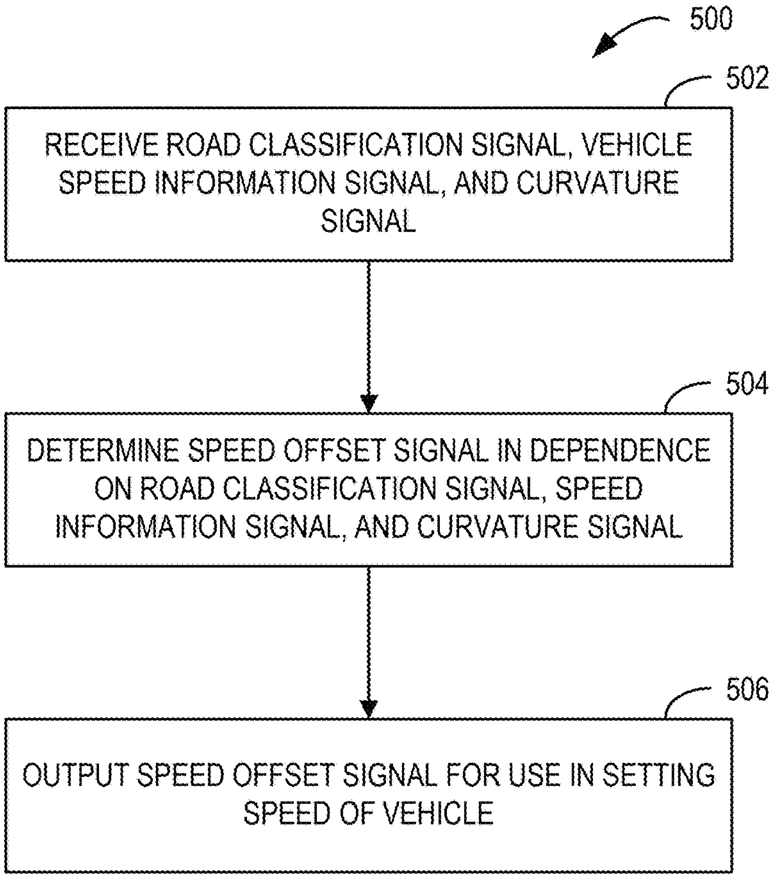
FIG. 5 shows a first flow chart illustrating an automatic speed control method according to an embodiment of the invention.

FIG. 5 illustrates a method 500 according to an embodiment of the invention. The method 500 is a method for automatic speed control of a vehicle. The method 500 may be performed by the automatic speed controllers 100, 300, 400 and the automatic speed control system 200 as described herein in relation to FIGS. 1, 2, 3, 4, but is not limited thereto. In particular, the processor 102 may implement computer-readable instructions which, perform the method 500 according to an embodiment of the invention. The method 500 comprises at block 502 receiving a road classification signal from a road classification module, a vehicle speed information signal from a speed information module, and a curvature signal, wherein the road classification signal comprises information relating to a road on which the vehicle may travel, the vehicle speed information module comprises a target lateral acceleration, and the curvature signal comprises information relating to a curvature profile of the road. At block 504, the method 500 comprises determining a speed offset signal comprising a speed offset value, in dependence on the road classification signal, the speed information signal and the curvature signal. The method 500 comprises at block 506 outputting the speed offset signal for use in setting a speed of the vehicle.

The method 500 may comprise determining a speed for the vehicle, in dependence on the speed information signal and the speed offset signal. The method 500 may comprise determining the speed for the vehicle by applying the offset value to the target lateral acceleration. The method 500 may comprise determining the road classification signal from map information and sensor information.

Figure 6:
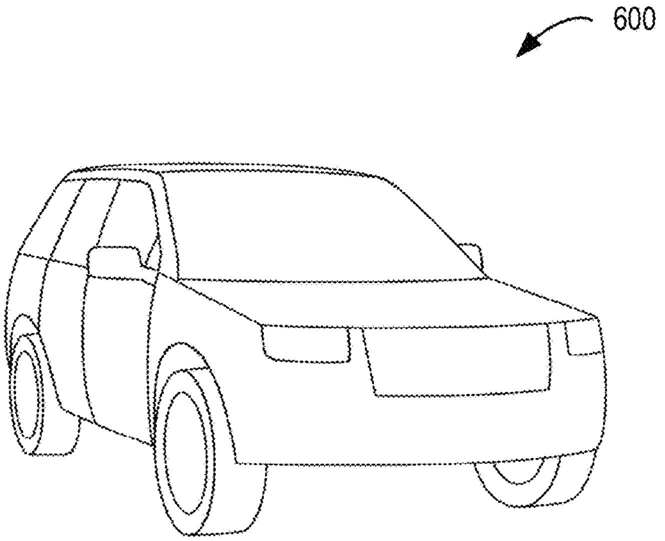
FIG. 6 shows a vehicle in accordance with an embodiment of the invention.

FIG. 6 illustrates a vehicle 600 according to an embodiment of the present invention. The vehicle 600 comprises an automatic speed controller 100 as described in relation to FIG. 1. Additionally or alternatively, the vehicle 600 may comprise one or more of the automatic speed controllers 100, 300, 400 and the automatic speed control system 200.

The automatic speed controllers 100, 300, 400 and the automatic speed control system 200 described herein in relation to FIGS. 1, 2, 3 and 4 comprise one processor 102, although it will be appreciated that this is merely illustrative. The processor 102 comprises processing means and memory means. The processing means may be one or more electronic processing device which operably executes computer-readable instructions. The memory means may be one or more memory device. The memory means is electrically coupled to the processing means. The memory means is configured to store instructions, and the processing means is configured to access the memory means and execute the instructions stored thereon. The processor 102 comprises an input means and an output means. The input means may comprise an electrical input of the processor 102. The output means may comprise an electrical output of the processor 102.

It will be appreciated that various changes and modifications can be made to the present invention without departing from the scope of the present application.

The invention claimed is:

1. An automatic speed controller for a vehicle, the automatic speed controller comprising one or more controllers, the automatic speed controller comprising:

a processor configured to implement computer-readable instructions to:

receive a road classification signal, a vehicle speed information signal, and a curvature signal, wherein the road classification signal comprises information relating to a road on which the vehicle may travel, the vehicle speed information signal comprises a target lateral acceleration, and the curvature signal comprises information relating to a curvature profile of the road, wherein the target lateral acceleration is based on an acceleration profile selected by a user, the acceleration profile selected from among eco, comfort, sport, and dynamic;

determine a speed offset signal comprising a speed offset value, in dependence on the road classification signal, the vehicle speed information signal, and the curvature signal; and output the speed offset signal to a powertrain control unit for use in setting a speed of the vehicle, the powertrain control unit arranged to control the speed of the vehicle according to the speed offset signal.

2. The automatic speed controller according to claim 1, wherein the processor is arranged to determine a speed for the vehicle, in dependence on the speed offset signal.

3. The automatic speed controller according to claim 2, wherein the processor is arranged to determine the speed for the vehicle further in dependence on the vehicle speed information signal.

4. The automatic speed controller according to claim 1, wherein the curvature profile comprises a radius of a curve in the road.

5. The automatic speed controller according to claim 1, wherein the road classification signal is derived from map information and sensor information.

6. An automatic speed control system, comprising:

the automatic speed controller according to claim 1; and a powertrain control unit arranged to control the speed of the vehicle according to the speed offset signal.

7. A vehicle comprising the automatic speed controller according to claim 1.

8. A method for automatic speed control in a vehicle, the method comprising:

receiving a road classification signal, a vehicle speed information signal, and a curvature signal, wherein the road classification signal comprises information relating to a road on which the vehicle may travel, the vehicle speed information signal comprises a target lateral acceleration, and the curvature signal comprises information relating to a curvature profile of the road, wherein the target lateral acceleration is based on an acceleration profile selected by a user, the acceleration profile selected from among eco, comfort, sport, and dynamic;

determining a speed offset signal comprising a speed offset value, in dependence on the road classification signal, the vehicle speed information signal and the curvature signal;

outputting the speed offset signal for use in setting a speed of the vehicle; and transmitting the speed offset signal to a powertrain control unit arranged to control the speed of the vehicle according to the speed offset signal.

9. The method as claimed in claim 8, further comprising determining a speed for the vehicle, in dependence on the vehicle speed information signal and the speed offset signal.

10. The method as claimed in claim 9, further comprising determining the speed for the vehicle by applying the speed offset value to the target lateral acceleration.

11. The method as claimed in claim 8, further comprising determining the road classification signal from map information and sensor information.

12. A non-transitory computer readable medium storing computer readable instructions which, when executed by a computer, cause the computer to perform the method according to claim 8.

13. A vehicle comprising the automatic speed control system according to claim 6.

* * * * *